(No Model.)
L. J. HIRT.
FRICTION CLUTCH.
No. 487,736.                                   Patented Dec. 13, 1892.
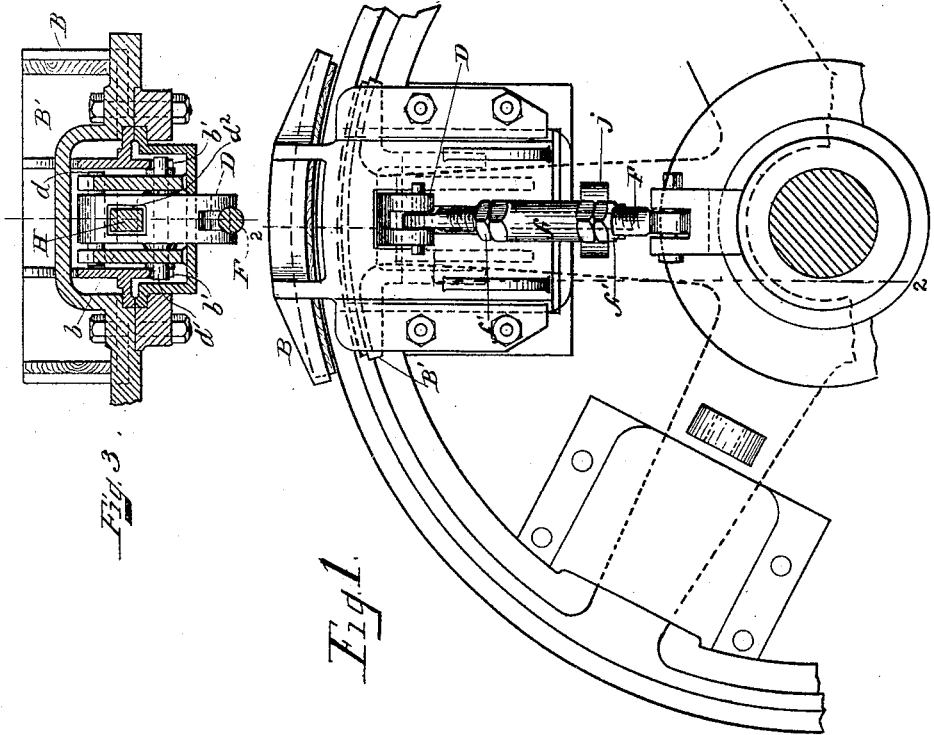
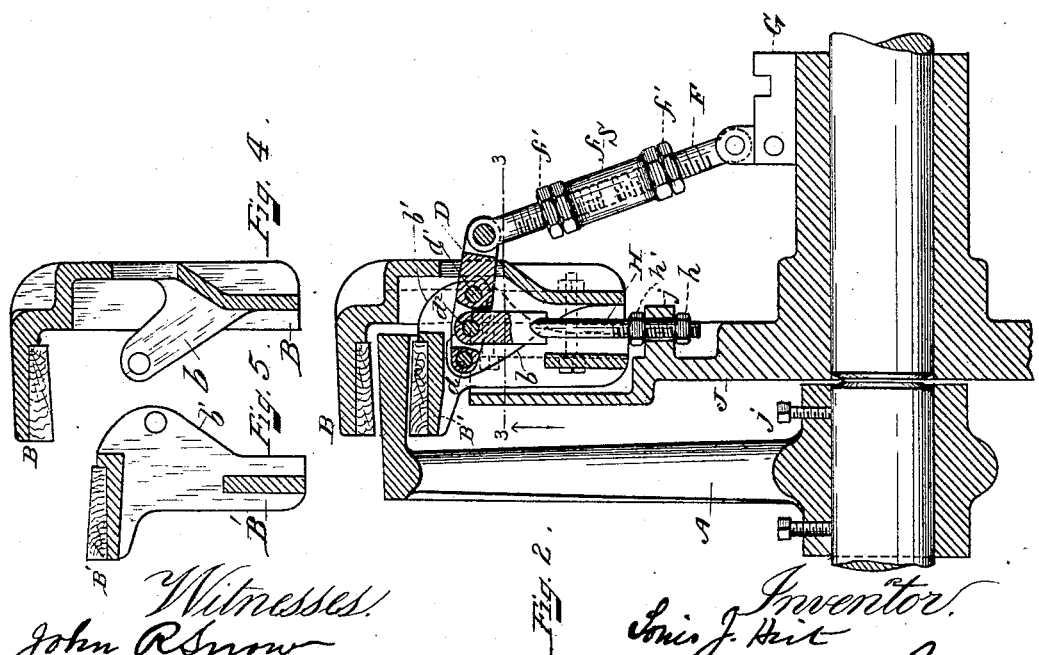
Witnesses:
John R. Snow
H. A. Renwick
Inventor:
Louis J. Hirt
by Magruder & Beale
his attorneys
THE NORRIS PETERS CO., PHOTO-LITHO., WASHINGTON, D. C.

UNITED STATES PATENT OFFICE.

LOUIS J. HIRT, OF ARLINGTON, MASSACHUSETTS.

FRICTION-CLUTCH.

SPECIFICATION forming part of Letters Patent No. 487,736, dated December 13, 1892.

Application filed April 18, 1892. Serial No. 429,679. (No model.)

*To all whom it may concern:*

Be it known that I, LOUIS J. HIRT, of Arlington, Middlesex county, State of Massachusetts, have invented an Improved Friction-Clutch, of which the following is a specification, reference being had to the accompanying drawings, in which—

Figure 1 is a side elevation of a portion of a pulley with my improved clutch. Fig. 2 is a section on line 2 2 of Fig. 1, and Fig. 3 a section on line 3 3 of Fig. 2; Figs. 4 and 5, details of the jaws.

Friction-clutches, in which pairs of radial jaws grip a flange on a pulley, and thereby compel the pulley and the jaws to rotate together, are well known, one example being my patent, No. 458,578, dated September 1, 1891, and the general features of such friction-clutches are too familiar to all skilled in this art to require description.

My present invention relates to such clutches; and one feature consists in connecting the radial jaws with the usual sliding sleeve by means of a single adjustable link and a lever.

In the drawings, A is a flange fast in any suitable way to a pulley; B and B', two radial jaws; D, a lever; F, an adjustable link, and G the sliding sleeve. When the sleeve G is in the position shown, both jaws B and B' are held out of contact with the flange A, so that the pulley can rotate freely, while the jaws B B' and their connections do not rotate, or vice versa, as will be clear; but when the sleeve G is moved inward (in the usual way too well known to require description) the link F exerts a thrust upon the outer end of lever D, thereby moving jaw B' outward and jaw B inward until they clamp flange A firmly, for jaw B is pinned by pin $d$, through ears $b$, to lever D and jaw B' is pinned by pin $d'$, through ears $b'$, to lever D. The adjustment of link F by means of the sleeve-nut $f$ enables the length of link F to be made just right to get the full toggle-action desired.

Were the lever D without a fixed fulcrum—that is, if middle pin $d^2$ were lacking—some device acting on one or both jaws B and B' would be necessary to hold the jaws B and B' out of contact with the flange A, and in order to get rid of such devices, which are objectionable, I mount the middle or fulcrum pin $d^2$ on an adjustable support or stud H, and this is an important feature of my invention. While the pin $d^2$ is in some sense a fixed fulcrum for lever D, yet I get rid, practically, of all objections due to a fixed fulcrum, and also get rid of all objections due to making lever D strictly a floating lever, for in order to adjust the clutch the middle pin $d^2$ is allowed play by slackening the nuts $h\ h'$ and the sleeve G then moved to its innermost position. The link F is then lengthened by means of sleeve-nut $f$ until the jaws B and B' clamp flange A with the desired force when the check-nuts $f'$ are set. It will be obvious that in this adjustment the lever D is in fact a floating lever, for stud H does not control pin $d^2$, as stud H is free to move endwise in either direction, the nuts $h\ h'$ being placed so as not to prevent that endwise movement; but after this adjustment (to compel the jaws B and B' to clamp flange A with the requisite force) the nuts $h\ h'$ are set against bracket $j$ on supporting-plate J, thereby holding fulcrum-pin $d^2$ in its proper place, and so that no great stress is thrown upon it when the jaws B B' clamp flange A, for with the adjustment described both jaws B B' clamp flange A just as if fulcrum-pin $d^2$ were absent or, what is the same thing, as if its carrying-stud H were free to move endwise. It will thus be clear that so far as the clamping action of jaws B B' is concerned I get all the advantages incident to making the lever D a floating lever—that is, where jaw B' comes into contact with the inner surface of flange A its pin $b'$ becomes the fulcrum of lever D and when jaw B comes into contact with the outer surface of flange A its pin $b$ becomes the fulcrum of lever D, the stud H springing sufficiently to allow each pin $d\ d'$ to act as the fulcrum as the stress upon the jaws B B' increases after the jaws are both in contact with the flange A. On the other hand, when sleeve G is moved to its outermost position after the parts are thus adjusted for the powerful clamping action of jaws B B' on flange A the fulcrum-pin $d^2$ should be substantially a fixed fulcrum, as if pin $d^2$ be practically fixed the inward motion of the outer end of lever D on pin $d^2$ as a fulcrum will compel the inner face of each jaw B B' to move the proper distance from the flange A, as shown in Fig. 2.

In case of wear my clutch can be readjusted by simply slackening the nuts $h\ h'$ to allow pin $d^2$ free play to an extent sufficient to prevent that fulcrum-pin $d^2$ from acting as a fulcrum for lever D, then moving sleeve G to its inner position, and then adjusting link F until the jaws B B' clamp with proper force. When fulcrum-pin $d^2$ is not held by its support H, it will be obvious that lever D is a floating lever and that each jaw acts as a fulcrum for the other, and, lastly, tightening nuts $h\ h'$ to hold fulcrum-pin $d^2$ in its new position, which will vary very slightly indeed from its first position, and yet this apparently-trivial variation is practically of great importance, for if pin $d^2$ were even one-hundredth of an inch out of place when the jaws B B' were clamped on flange A one jaw would be forced against flange A much harder than the other and undue strain would be thrown on pin $d^2$; but obviously if pin $d^2$ be allowed to take position when the jaws B B' are clamped with the desired force upon flange A both jaws will be forced equally against that flange, and the strain on pin $d^2$ will be trifling, and it is also obvious that if pin $d^2$ be then fixed by tightening nuts $h\ h'$ in the position it thus takes it will not be subjected to any material strain when the jaws B B' are again clamped powerfully on flange A.

In practice four or more pairs of jaws are used, and it has been found difficult to insure a proper clamping effect from each pair with a lever having a fixed fulcrum corresponding to pin $d^2$, while, on the other hand, if pin $d^2$ were omitted and the lever made a floating lever, springs or the like acting directly on the jaws are necessary to keep the jaws in proper position when unclamped. In this view the main advantage of this feature of my invention is that it has all the desirable features of the floating lever, and also all the desirable features of the lever with a fixed fulcrum. These two features of my invention—first, connecting the jaws with the sliding sleeve by a single adjustable link and a lever, and, second, the adjustable fulcrum-pin, which is practically idle when the jaws are clamped, but serves as a fulcrum for the lever when the jaws are unclamped—are best used together; but obviously either may be used without the other.

A third feature of my invention consists in tapering the flange from its outer edge and inclining the bearing-surfaces of each jaw to correspond, as clearly shown in the drawings. The object and result is that the flange A is drawn toward plate J, so that any endwise motion of the two shafts X X' tending to separate them is prevented. This is practically important where lines of shafting are coupled together.

What I claim as my invention is—

1. In combination, a pulley, an annular flange thereon, radial jaws adapted to engage opposite surfaces of the flange, a lever pinned at the end nearest the pulley to the outer jaw, at the end farthest from the pulley to an adjustable link, at an intermediate point to the inner jaw, the adjustable link, and a sliding sleeve connected with the adjustable link, as and for the purposes set forth.

2. In a friction-clutch, the combination of an annular flange, radial jaws, one opposite the inner and the other opposite the outer surface of the flange, a lever mounted on a middle pin, an adjustable support for that pin, a second pin connecting the lever and one of the jaws at one side of the middle pin, a third pin upon the other side of the middle pin and connecting the lever with the other jaw, and a fourth pin connecting the lever to the actuating mechanism, all substantially as described.

3. In a friction-clutch, the combination of an annular flange made tapering, as described, and radial clamping-jaws, one opposite the inner and the other opposite the outer surface of the flange, with their bearing-surfaces inclined to correspond with the inclined surfaces of the tapering flange, substantially as and for the purpose specified.

LOUIS J. HIRT.

Witnesses:
J. E. MAYNADIER,
JOHN R. SNOW.